Figure 1:
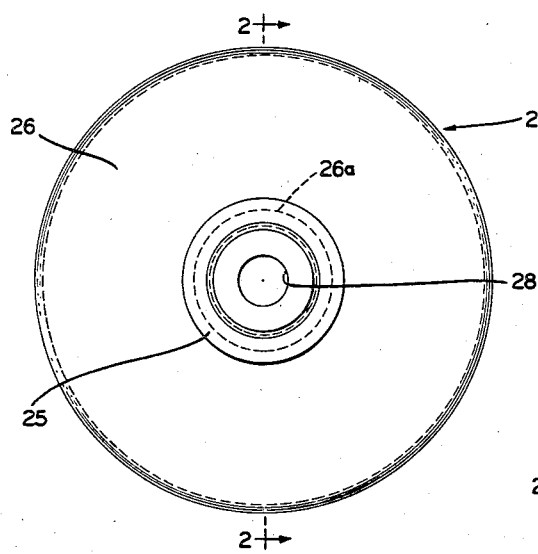

Sept. 16, 1958  N. V. SPROUL  2,852,117
CENTRIFUGAL CLUTCH CONSTRUCTION
Filed May 18, 1954  2 Sheets-Sheet 1

INVENTOR.
Nolte V. Sproul
BY Frease & Bishop
ATTORNEYS

Sept. 16, 1958 N. V. SPROUL 2,852,117
CENTRIFUGAL CLUTCH CONSTRUCTION
Filed May 18, 1954 2 Sheets-Sheet 2

INVENTOR.
Nolte V. Sproul
BY Frease & Bishop
ATTORNEYS

United States Patent Office 2,852,117
Patented Sept. 16, 1958

2,852,117

CENTRIFUGAL CLUTCH CONSTRUCTION

Nolte V. Sproul, Massillon, Ohio, assignor to Automatic Steel Products, Inc., Canton, Ohio, a corporation of Delaware Application May 18, 1954, Serial No. 430,470

17 Claims. (Cl. 192—105)

My invention relates to improvements in centrifugal clutch construction and more specifically to the weight type centrifugal clutch. Even more specifically, my invention relates to a centrifugal clutch construction which provides a clutch that is flexible as well as self-energizing.

Some of the prior constructions of centrifugal clutches have been of the so-called weight clutch type. In such construction, arcuate weight segments are pivotally connected at one of their ends to a rotor member. Helical springs are connected to the other ends of the weight segments with the springs also being connected to the rotor member. Friction shoes are mounted on the outer periphery of the weight segments with the rotor assembly being received in a housing member having an axially extending annular edge portion.

When the rotor member of such clutch is rotated, the weight segments, due to centrifugal force, pivot on the rotor member and extend the helical springs thus moving radially outwardly. This forces the friction shoes mounted thereon against the inner surface of the axially extending housing portion and completes the clutch driving connection.

This type of clutch construction has been used on both coupling type and pulley type clutches, that is, a clutch construction where the rotor member is mounted on one shaft and the housing member is mounted on another shaft with the two shafts being axially aligned, or where the housing member is mounted on a bearing directly on the hub of the rotor member.

Another similar prior type of clutch construction uses weight segments that are only connected to the rotor member by radially extending helical springs which in turn are connected into the center of the rotor member. In this case, the shoes again are mounted on the outer arcuate surface of the weight segments.

One of the difficulties with these types of clutch constructions is that there are high stresses created in the springs at their points of connection to the weight segments and to the rotor member. This causes frequent spring breakage and consequently frequent cases of failure in service, resulting in lost time and high maintenance cost.

Another difficulty with these types of clutch constructions is that these clutches, due to their inherent design, are usually of the positive lockup type. That is, when the centrifugal force of the weight segments overcomes the force of the helical springs, the friction shoes are forced against the housing member in such a way as to cause the clutch to completely lock up as if it were merely a solid member. As a result of this lockup quality, the clutch engages with a great deal of noise and the various members thereof are subjected to a high shock load. Consequently, there are extreme stresses created in the various parts of the clutch causing a possibility of failure of these parts.

An additional difficulty of these types of clutch constructions is that they are unsatisfactory in most coupling type applications, that is, where the housing member and the rotor member are mounted on separate axially aligned shafts. If there is any misalignment between the two shafts upon which the two parts of the clutch are mounted, it creates an erratic functioning of the clutch as to engagement and disengagement, as well as causing excessive wear of the various parts, particularly the friction shoes. This erratic engagement and disengagement of the clutch causes it to be highly undependable and makes it impossible to maintain a predetermined exact engagement speed.

These types of clutches are also usually expensive to manufacture and because of their inherent designs are usually of considerable weight for any particular application.

Another prior type of centrifugal weight clutch construction is one having rubber segments bonded to the hub of the rotor member. These rubber segments extend radially outward towards the axially extending annular portion of the housing member. Arcuate weight segments are bonded to the outer periphery of these rubber segments and no springs are used in the rotor member. In this case, as the rotor member rotates, the centrifugal force of the weight segments causes the resilient rubber to stretch allowing the shoes, which are mounted on the outer annular face of the weight segments, to become engaged with the housing member of the clutch.

One of the difficulties with this bonded rubber type rotor is that it is difficult to accurately set the engagement speed between the rotor and the housing member. Even if such is accomplished with any degree of accuracy, once it is set it is impossible to change it without completely reassembling and rebonding the rubber parts in the rotor member. Also, there are many high stresses produced in the rubber portion, that is, at the points of bonding between the rubber members and the hub of the rotor and at the weight segments and the rubber members. This causes a great danger of failure at these points under the repeated operation of this type of clutch.

Another difficulty of this bonded rubber type clutch construction is that the engagement and disengagement speed will change as the friction shoes wear. As the friction shoes wear, the weight segments have to travel further radially outward to engage the housing member and thus a greater centrifugal force is required to stretch the rubber this added distance. This shoe wear has a much greater effect from this standpoint on the bonded rubber type clutch than it would on those having a helical spring arrangement since the resiliency of rubber decreases as the load on it is increased. This engagement speed will also be changed in the bonded rubber construction due to the heat caused by the friction shoes slipping under the engagement load which causes a change in the resiliency of the rubber and thus creates a change in the engagement speed of the clutch.

It is, therefore, a general object of the present invention to provide a centrifugal clutch construction which will overcome the difficulties of the prior constructions.

It is a primary object of the present invention to provide a centrifugal clutch construction which has an amount of flexibility between the rotor member and the housing member to take care of misalignment where the clutch is of the coupling type.

It is another object of the present invention to provide a centrifugal clutch construction which has a cushioned engagement so that there is not an abrupt or shock load transmitted to the various parts of the clutch.

It is still another object of the present invention to provide a centrifugal clutch construction which is quiet in operation and has a uniform engagement and release speed even after a great amount of use.

It is an additional object of the present invention to provide a centrifugal clutch construction which is self-energizing without lockup difficulties but provides for slippage under overload conditions and thus provides overload protection.

It is also an object of the present invention to provide a self-energizing clutch which is operative with equal capacity in either direction of rotation.

It is a further object of the present invention to provide a centrifugal clutch construction which has low release spring loads eliminating spring breakage and reducing maintenance costs.

It is a still further object of the present invention to provide a centrifugal clutch construction in which the engagement speed can be accurately set and changed if desired after once being set.

It is another object of the present invention to provide a centrifugal clutch construction which can be used in either a coupling type or pulley clutch to give satisfactory performance in either application.

Finally it is an object of the present invention to provide a centrifugal clutch construction which accomplishes all of the above objects but yet is simple in design and economical to manufacture.

These and other objects are accomplished by the parts, construction, arrangements, combinations and subcombinations comprising the present invention, the nature of which is set forth in the following general statement, preferred embodiments of which—illustrative of the best modes in which applicant has contemplated applying the principles—are set forth in the following description and illustrated in the accompanying drawings, and which are particularly and distinctly pointed out and set forth in the appended claims forming a part hereof.

In general terms the improved centrifugal clutch construction constituting the present invention may be stated as including a hub member, a rubber spider mounted on the hub member, means connecting said hub member and said spider for driving engagement therebetween, a housing member, and friction means engaged with said spider and engageable with said housing member in response to centrifugal force.

More specifically, the improved centrifugal clutch construction constituting the present invention may be stated as including a hub or driving member, a rubber spider mounted on said hub member and provided with radial projections having holes formed therein and recessed portions therebetween, side plates mounted on said hub member and clamping the spider therebetween, pins connecting the side plates and extending through said holes in the spider, shim members mounted in said recessed portions of the spider, friction elements having outer arcuate surfaces with slots formed circumferentially therein engaged in said recessed portions in the spider and on said shim members, an annular helical garter spring engaged in said slots in the friction elements, holding the friction elements in the recessed portions in the spider, and a housing or driven member engaged by said friction elements upon rotation of the driving member.

Figure 2:
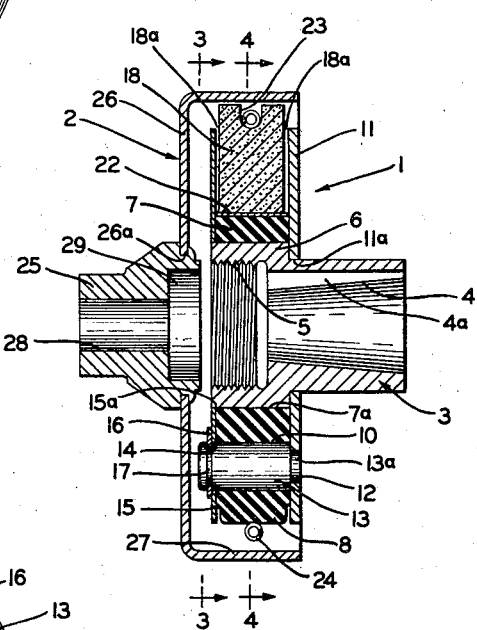
Figure 3:
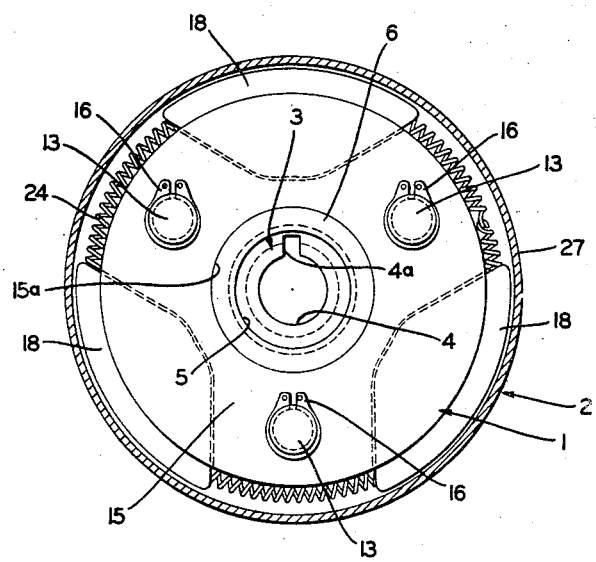
Figure 4:
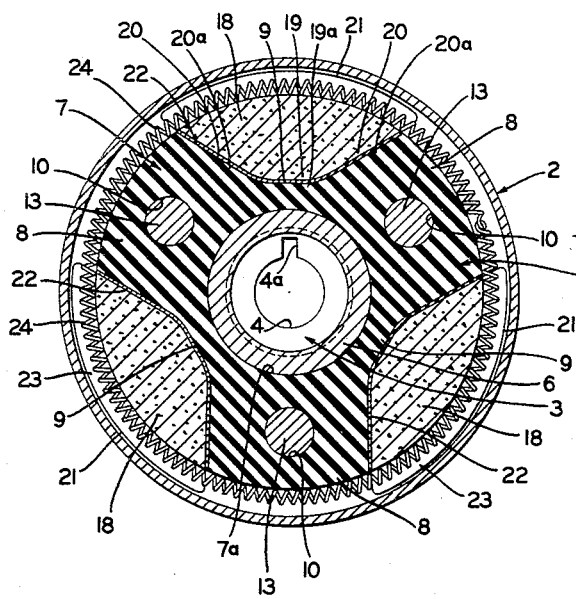
Figure 5:
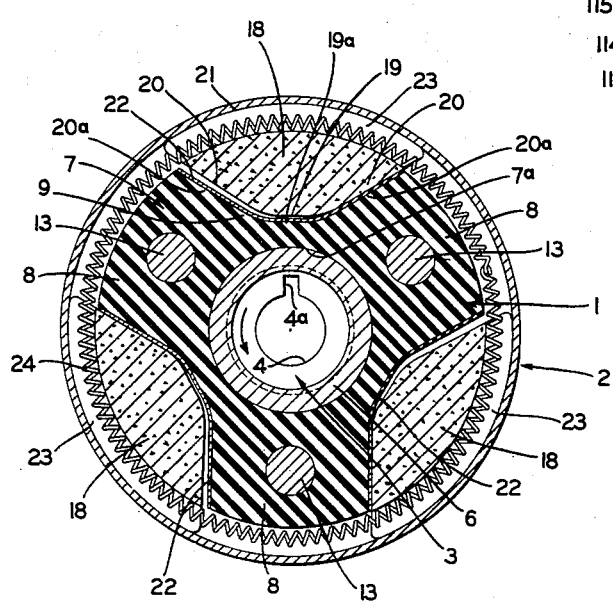

By way of example, embodiments of the centrifugal clutch construction of the present invention are illustrated in the accompanying drawings forming a part hereof wherein like numerals indicate similar parts throughout the several views, and in which:

Fig. 1 is an end elevation of the improved centrifugal clutch construction looking at the housing member;

Fig. 2, a sectional view looking in the direction of the arrows 2—2 in Fig. 1 with the clutch disengaged;

Fig. 3, a sectional view looking in the direction of the arrows 3—3 in Fig. 2 with the clutch disengaged;

Fig. 4, a sectional view looking in the direction of the arrows 4—4 in Fig. 2 with the clutch disengaged;

Fig. 5, a view similar to Fig. 4 with the clutch engaged; and

Figure 6:
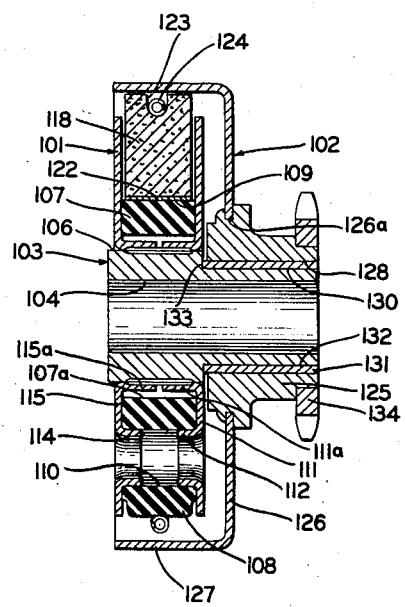

Fig. 6, a sectional view of a second embodiment of the improved centrifugal clutch construction of the present invention.

The centrifugal clutch construction of the present invention includes a rotor or driving member generally indicated at 1 and a housing or driven member generally indicated at 2.

The rotor member 1 includes a hub member 3 which is cylindrical in shape and has a tapered bore 4 formed axially therein. This tapered bore 4 extends from the outermost end of the hub member 3, the right-hand end in Fig. 2, a portion of the distance to the innermost face of the hub member, the left-hand end in Fig. 2. A keyway 4a is formed in the hub 3, opening into the tapered bore 4 as shown in Figs. 2 and 3. Between the innermost face of the hub member 3 and the end of the tapered bore 4 a threaded portion 5 is formed for a purpose to be hereinafter described.

The hub member 3 has a smaller diameter at its outermost end than at its innermost end 6 which forms the seat for the spider 7. The hub 3 is preferably made of steel and formed as a screw machine part.

Hub member 3 may be of many different configurations and it is not necessary that it be round as shown. Additionally, the bore in the hub 3 may be of the same diameter throughout in which case the threaded portion 5 is eliminated.

The spider 7 is made of a resilient material preferably rubber or a resilient plastic material and has an opening 7a formed centrally therein. The hub portion 6 is received through this opening 7a so that the spider 7 extends radially outward and is seated on the hub portion 6 of the hub member 3. Radial projections 8 are formed on the outer periphery of the spider member 7 with generally arcuate recessed portions 9 being formed between these radial projections 8. Holes 10 are formed centrally in the radial projections 8 and are spaced from the outer periphery of the radial projections.

A side plate 11 is mounted on the hub member 3 abutting the outer side of the larger diameter portion 6 and abutting the outer periphery of the smaller diameter portion of the hub member 3.

The side plate 11 is preferably a stamped strip steel part and has a circular opening 11a formed centrally therein. The hub member 3 is received through this opening 11a in the side plate 11. The side plate 11 is preferably mounted on the hub member 3 by means of a tight press fit but may be welded in place or held by other conventional means.

The side plate 11 has holes 12 formed therein in direct axial alignment with the holes 10 in the rubber spider 7 and has an outer annular periphery of substantially the same diameter as the outer periphery of the projections 8 on the spider 7. Drive pins 13 are mounted in the holes 12 in the drive plate 11, these drive pins being cylindrical in shape having a smaller diameter portion 13a which preferably is press fitted into the holes 12 of the side plate 11. Pins 13 extend from the side plate 11 axially through the holes 10 in the rubber spider 7 and through holes 14 in a second side plate 15.

The side plate 15 is also preferably a stamped strip steel part and has an outer annular periphery of approximately the same diameter as the side plate 11. Side plate 15 in the particular construction shown has an opening 15a located centrally therein of a diameter slightly larger than the outside diameter of the hub portion 6. Thus the side plate 15 fits over the outer diameter of the hub portion 6, in this case, with a slide fit between the hub portion 6 and the side plate opening 15a. Side plate 15 is held in place by means of snap rings 16 which fit in annular grooves 17 spaced from the ends of the drive pins 13, as shown.

The space between the side plate 11 and the side plate 15 is slightly less than the normal width of the spider 7 so that the spider 7 is tightly clamped and compressed therebetween. Also, since the side plates 11 and 15 have an outer annular diameter equal to the outer annular diameter of the projections 8 on the spider 7, the recesses formed in the spider 9 between the radial projections 8 are enclosed on either side by these side plates 11 and 15.

Friction segments or shoe members 18 are received in the recesses 9 formed between the radial projections 8 of the spider 7. These friction segments 18 are preferably an asbestos base friction shoe material with phenol binder, but can be made of any desired clutch shoe material, either organic or metallic. The friction segments 18 are generally triangular in cross-section having slightly flattened base portions 19 and angled side portions 20 angled outwardly toward the outer periphery of the rotor member 1, thus forming a generally arcuate portion to match the recesses 9. The tops 21 of the friction segments 18 are arcuate in shape and extend slightly beyond the outer peripheries of the side plates 11 and 15. The width of the friction segments is slightly less than the distance between the side plates 11 and 15 for a purpose to be hereinafter described, resulting in the clearance spaces 18a.

The recesses 9, formed between the projections 8 of the spider 7, are of the same shape as the bottom 19 and the sides 20 of the friction member 18 so that the friction shoes 18 fit fully in these recesses 9. The recesses 9, therefore, have matching flattened base portions 19a and outwardly angled side portions 20a which abut the matching portions 19 and 20 of the friction segments when the rotor member 1 is at rest.

Shim members 22 are mounted in the recesses 9 of the spider 7 between the friction segments 18 and the spider 8. Shim members 22 are preferably formed of polished steel strip and are of the same width as the spider 7, and extend to the outer edges of the projections 8 of the spider 7.

Grooves 23 are formed circumferentially in the outer periphery of the arcuate outer surfaces 21 of the friction segments 18 and are centrally located between the sides of the friction segments 18, as best seen in Fig. 2. An annular garter spring 24 is received in these grooves 23 and completely circumferentially surrounds the friction segments 18 and the spider 7 abutting the outer periphery of the projections 8 on the spider 7. This garter spring 24 retains the friction segments 18 against the shim members 22 in the recesses 9 of the spider member 7 while rotor member 1 is in a stationary position or at rest, or until a predetermined speed of rotation is reached.

The housing member 2 includes a hub portion 25, a side plate portion 26 having a circular opening 26a formed centrally therein and an axially extending flange portion 27. The hub member 25 is preferably formed of a screw machine steel part and has a hole 28 formed axially through its central portion. A countersunk portion 29 is formed in the inner surface of the hub 25 for a purpose to be hereinafter described.

The side plate portion 26 of the housing member 2 extends radially outward with the opening 26a fitting the outer periphery of the hub member 25 and is preferably staked or otherwise solidly fastened in place to provide driving engagement between the hub member 25 and the side plate 26. The side plate 26 extends radially outward to a diameter slightly larger than the outer diameter of the friction segments 18 and there is formed at substantially right angles into the axial flange portion 27, the plate 26 and the flange 27 being preferably a unitary steel stamping. The flange portion 27 is slightly greater in width than the assembled width of the side plates 11, the spider 7 and the side plate 15 so that when the clutch is mounted with the inner ends of the hubs 3 and 25 spaced slightly apart, the flange portion 27 will cover the outer peripheries of the friction segments 18 and the side plate 11.

The rotor member 1 is mounted on a driving shaft, not shown, having a tapered end portion. This tapered end portion matches the tapered bore 4 in the hub member 3 and the hub is forced up on the taper of the driving shaft by means of a nut, not shown, threaded to the end of the driving shaft. A key may also be inserted in the keyway 4a of the hub 3 and into a matching keyway in the driving shaft. Thus, driving engagement is obtained between the driving shaft and the rotor member 1.

The purpose of the threaded portion 5 in the large diameter hub portion 6 is for disassembling the rotor member 1 from the driving shaft. When this is done, a puller device is threaded into the threaded portion 5, to force the hub member 3 off of the taper on the driving shaft.

The housing member 2 is mounted on a driven shaft, not shown, which is axially aligned with the driving shaft, but spaced slightly from it. The hub member 25 is held on the driven shaft in driving engagement by means of a nut, not shown, threaded on the end of the driven shaft and received in the counter-sunk portion 29 in the housing hub member 25. When properly mounted, the rotor member 1 and the housing member 2 are in the relative positions shown in Fig. 2 with the hub members 3 and 25 in axial alignment and with the friction segments 18 slightly spaced from the underside of the flange portion 27 of the housing member 2 as shown.

When the rotor member 1 is at rest, the friction segments 18 are held in the recesses 9 in the spider 7 by the helical spring 24 exerting a force radially inward on these friction segments 18, as shown in Figs. 2, 3 and 4. As the rotor member 1 begins to rotate, the helical spring 24 continues to retain the friction segments 18 in the recesses 9 until the engagement speed of the clutch is reached. This engagement speed is predetermined by the amount of weight in the friction segments 18 and the centrifugal force exerted thereby at a certain speed as against the spring or retaining force of the helical garter spring 24.

When the predetermined release or engagement speed of the rotor member 1 is reached, the centrifugal force of the friction segments 18 begins to overcome the retaining force of the garter spring 24 and the friction segments 18 begin to move radially outward. As the friction segments 18 move radially outward, they engage the inner surface of the axially extending flange portion 27 of the housing member 2 and thus provide frictional driving engagement between rotor member 1 and the housing member 2.

As this driving engagement is established between the friction segments 18 and the housing member 2, the friction segments are forcced upon one of the outwardly angled sides 20a of the recesses 9 in the spider 7, as shown in Fig. 5, with the driving member rotating in the direction indicated by the arrow. Thus rotational motion is transmitted from the driving shaft to the hub member 3, from the hub member 3 to the side plate 11, from the side plate 11 to the drive pins 13, from the drive pins 13 to the spider 7, from the spider 7 to the friction segments 18, and from the friction segments 18 to the housing member 2 and ultimately to the driven shaft.

When such driving engagement is established, one of the outwardly angled side portions 20a of the recesses 9 in the spider member 7 abuts one of the outwardly angled side portions 20 of the friction segments 18, the flattened bottom portions 19a of the recesses 9 being spaced slightly from the flattened bottom portion 19 of the friction segments 18 and the opposite outwardly angled sides 20a of the recesses 9 being spaced slightly from the adjoining outwardly angled side portion 20 of the friction segment 18, as shown in Fig. 5.

The friction shoes 18 will slip slightly on the underside of the flange portion 27 of the housing member 2 for a period of time after the beginning of this driving engagement until the driven shaft connected to the housing member 2 gains the same rotational speed as the rotor member 1. At that time there is no slipping between the rotor member 1 and the housing member 2 unless the driven load exceeds the capacity of the clutch, which capacity is determined by the centrifugal force of the friction segments 18 and the friction created thereby between the friction segments 18 and the housing member 2. When the capacity of the clutch is exceeded, the friction segments 18 will again slip on the housing member 2 and thus give overload protection to the motor connected to the driving member.

An additional factor in the clutch construction is shown in Fig. 5. As the driving engagement takes place between the spider 7 of the rotor 1, the friction segments 18 and the flange portion 27 of the housing member 2, the shim members 22 that are mounted between the spider member 7 and the friction segments 18 reduce the friction between these parts and allow the friction segments to slide up on the outwardly angled surface 20a of the spider 7. This causes the upper corner of the friction segments 18 to wedge between the flange 27 of the housing member 2 and the outer corner of the radial projections 8 on the spider 7. This wedging caused by the wedge surfaces 20 on the friction segments and 20a on the spider constitutes the self-energizing feature in the improved clutch construction.

As the load of the driven member increases, the friction segments 18 tend to wedge tighter between the spider 7 and the flange 27 of the housing member 2, thus increasing the capacity of the clutch. When, however, the load of the driven member is increased to a certain predetermined overload point, this wedging action will no longer be great enough to overcome this additional load and the clutch will still act to give overload protection to the driving motor. In other words, although the clutch is a self-energizing clutch and the capacity of the clutch increases for an increased load to a certain maximum point, the clutch is not a lockup type clutch but gives overload protection.

When the rotational speed of the driving shaft is decreased, it reaches a point where the spring or containing force of the helical garter spring 24 overcomes the centrifugal force of the friction segments 18 and at this point the friction segments 18 begin to move radially inward. As the friction segments 18 move radially inward, they no longer frictionally engage the underside of the flange 27 of the housing member 2 and there is no longer any driving engagement between the rotor member 1 and the housing member 2. Thus the clutch is disengaged and the friction segments 18 are forced into full abutment within the recesses 9 of the spider 7.

The shim members 22 allow the above described sliding motion between the friction segments 18 and the spider 7 both for engagement and disengagement action as well as the self-energizing action of the clutch. These shim members not only reduce the friction between these parts but also give protection to the resilient spider member 7 which is made preferably of rubber and is, therefore, relatively soft.

Due to the clearance spaces 18a between the friction segments 18 and the side plates 11 and 15 and also due to the resiliency of the spider member 7, it is possible, even with the driving and driven shafts and consequently the hub members 3 and 25 slightly out of axial alignment, to have proper driving engagement between the rotor member 1 and the housing member 2 without damaging or excessively wearing any of the parts of the clutch.

If the rotor member 1 and the housing member 2 are slightly misaligned, the friction segments 18 may shift laterally between the side plates 11 and 15 due to the clearance spaces 18a. The friction segments 18 may also tilt slightly axially due to these clearance spaces 18a and the resiliency of the spider 7 allowing the spider 7 to compress slightly where necessary to allow the friction segment 18 to tilt. This shifting and tilting action of the friction segment 18 on the spider 7 is greatly aided by the shim members 22 by reducing the friction therebetween. This action provides the flexibility feature of the clutch construction of the present invention.

The second embodiment of the clutch construction of the present invention is shown in cross-section in Fig. 6 and operates on precisely the same principles as the clutch shown in the first embodiment, that is, this clutch construction has the self-energizing feature and the flexibility feature of the first embodiment. The principal difference between the two embodiments is that the first embodiment is for a coupling type clutch whereas the second embodiment is for a pulley type clutch.

The clutch construction shown in Fig. 6 includes a rotor member 101 and a housing member 102. The rotor member 101 includes a hub member 103 having a circular bore 104, side plates 111 and 115, a spider 107 and the friction segments 118.

The hub member 103 is cylindrical in configuration and has one diameter 130 for part of its length and another diameter 106 for the remainder of its length. The portion 106 has a larger diameter than the portion 130. The side plates 111 and 115 are of similar construction and have centrally located extruded center hole portions 111a and 115a. The side plates 111 and 115 extend radially outward and have circular outer peripheries.

The spider 107 has the same configuration as before with radially projecting portions 108 and recesses 109 and a centrally positioned hole 107a slightly larger in diameter than the outside diameters of the extruded outer hole portions 111a and 115a of the side plates 111 and 115.

The spider 107 also has the holes 110 formed in the radially projecting portions 108 as before. The side plates 111 and 115 have circular extruded hole portions 112 and 114 formed therein in direct alignment with the holes 110 formed in the spider 107 and extending inwardly towards the spider 107.

The outer diameter of the hub portion 106 is knurled so that as the side plates 111 and 115 are pressed over the hub portion 106, the extruded hole portions 111a and 115a are tightly engaged by a press fit over the hub portion 106. When the side plates 111 and 115 are pressed over the hub portion 106, the spider 107 has been placed between these side plates so that the inwardly extending extruded hole portions 112 and 114 are received in the holes 110 formed in the radial projecting portions 108 of the spider 107. Thus when the side plates 111 and 115 are mounted on the hub portion 106 they securely engage the spider 107 at the holes 110 as shown in Fig. 6.

The friction segments 118 are identical in construction to those in the first embodiment and contain the same annular groove 123 to receive the helical garter spring 124. Identical shim members 122 are mounted between the friction segments 118 and the recesses 109 formed in the spider member 107.

The housing member of this second embodiment of clutch construction includes the same type of housing side plate portion 126 and an axially extending annular flange portion 127. The side plate portion 126 has the same centrally located opening 126a which is received over a hub member 125.

The hub member 125 in this case, however, has a sprocket member 131 mounted on its outer periphery and has a cylindrical bearing preferably of sintered copper or bronze mounted in its inner periphery within the bore 128. The bearing member 131 has an inner bore 132.

When the rotor member 101 and the housing member 102 are assembled as a clutch the smaller diameter portion 130 of the hub member 103 is received within the bore 132 of the bearing member 131 so that the axially extending flange portion 127 of the housing member 102 extends across the friction segments 118 and the outer periphery of the side plate 115. The bearing member 131 is slightly longer than the length of the hub member 125, so that the end 133 of the bearing member 131 bears against the side of the larger diameter portion 106 of the hub member 103 as shown in Fig. 6.

The operation of the clutch is the same as before with the driving shaft mounted in the bore 104 of the hub 103 but with the driven member being connected to the housing member 102 by means of a chain drive to the sprocket member 134. The sprocket member 134 is mounted solidly on the outer diameter of the hub member 125 preferably by welding.

The principal difference between the first and second embodiments of the clutch construction is that the first embodiment comprises a coupling type clutch in which the rotor member and housing member are mounted on separate axially aligned shafts; whereas in the second embodiment, a pulley type clutch is provided in which the housing member is mounted through a bearing directly on the hub of the rotor member. Although many advantages can be obtained by use of the clutch construction of the present invention in a pulley type clutch, greater advantages are obtained in the use of the improved construction in a coupling type clutch.

In the pulley type clutch full advantages can be obtained from the self-energizing principle and some advantages from the flexibility feature of this clutch construction, for instance, the flexibility feature gives a cushioned and quiet engagement. In the pulley type clutch, however, there is little chance for misalignment between the rotor and housing members so that the feature of the present clutch construction of being able to operate under misalignment conditions is not taken advantage of in this type construction.

A very important feature shown in the second embodiment is, however, very beneficial regardless of whether the clutch is of the pulley or coupling type. That is, the feature of replacing the drive pins 13 shown in the first embodiment in Fig. 2 with inwardly extending extruded hole portions integral with the side plates is shown at 112 and 114 in Fig. 6. Also an important feature is the extruded hole portions 111a and 115a shown in the second embodiment in Fig. 6 to provide a simple means of mounting the side plates 111 and 115 on the hub member 125. Both of these features of replacing the drive pins with extruded hole portions in the side plates and providing extruded central hole portions in the side plates for simplicity of hub mounting add greatly to the economy of producing the clutch.

In the particular clutch construction shown in both the first and second embodiments, the friction segments 18 are shown formed completely of friction material, such as an asbestos base with a phenol binder. In many cases and particularly where a higher speed engagement is desired, the friction segments may be made as shown. However, when high capacity low speed engagement is desired, it may be necessary to place additional weight in the friction segments.

In such event, the additional weight may be molded or placed within the friction material, or the lower portion of the friction segments 18 may be made of a heavy metal with the friction material molded to the outer periphery of this metal or in the form of a separate friction shoe which clamps over the metal portion. Thus, where the term "friction segment" is used herein and in the claims, it is to be understood that the term includes either friction segments made entirely from friction material or those containing additional metal weight.

By use of the resilient plastic or rubber spider in the improved clutch construction, it is possible, as before described, to obtain the flexibility feature and also obtain a cushioning effect as well as a positive engagement between the spider, the friction segments and the housing member. This cushioning effect not only decreases the stress in the various parts of the clutch but also provides a quiet engagement. Thus, the invention provides a self-energizing type clutch construction which eliminates one of the major defects of prior constructions by eliminating noisy, erratic and undependable operation.

Also, as before stated, although the improved construction is self-energizing, it does not have the lockup difficulties but gives overload protection to the particular driving medium used. That is, through this self-energizing feature the clutch will increase in capacity for some increase in load, but when a maximum load has been reached it will begin to slip and not transmit this increased load to the drive means thereby giving overload protection.

All of these beforementioned features are obtained in the clutch construction of the present invention but yet this construction is simple in design and economical to manufacture. Additionally the resulting clutch construction is relatively light in weight for any particular capacity of clutch.

Because of the particular means by which the friction segments are engaged with the spider member and the shape and construction of the recesses formed in the spider member to receive these friction segments, the friction segments are free to move in and out of these recesses and also free to move laterally in these recesses and tilt axially of the rotor member to compensate for any misalignment between the rotor member and the housing member, whereby great flexibility is obtained in this clutch construction as well as elimination of erratic engagement.

With the use of a helical garter spring received in annular slots formed lengthwise in the arcuate outer periphery of the friction segments, it is possible to greatly reduce spring breakage normally prevalent. In prior constructions, where individual radial springs are used to retain the friction segments out of engagement until a predetermined speed has been reached, high stresses are created in the connection hooks for the springs. This disadvantage is not present where a helical garter spring is used, thus greatly reducing the failures and resulting maintenance costs in clutch construction.

Thus, the centrifugal clutch construction of the present invention provides a self-energizing clutch which has flexibility allowing for misalignment but yet does not create increased stresses and erratic wear in the various clutch parts; in which the clutch has a cushioned quiet engagement which does not transmit shock loads to the various parts of the clutch; in which the clutch has a uniform engagement and release speed even after a great amount of use; in which the clutch is of a self-energizing type but avoids lockup difficulties while giving overload protection to the driving medium; in which the clutch has low release spring loads eliminating spring breakage and reducing maintenance costs; in which the engagement and release speed of the clutch can be accurately set and changed if desired by a mere spring change after once being set without requiring a complete rebuilding of the clutch; in which the clutch construction may be incorporated in either a coupling type or a pulley type clutch to give satisfactory performance in either application; and in which all of these advantageous features are obtained in a construction that is simple in design and economical to manufacture.

In the foregoing description, certain terms have been used for brevity, clearness and understanding, but no unnecessary limitations are to be implied therefrom because such words are used for descriptive purposes herein and are intended to be broadly construed.

Moreover, the embodiments of the improved construction illustrated and described herein are by way of example and the scope of the present invention is not limited to the exact details of construction shown.

Having now described the invention, the construction, operation and use of preferred embodiments thereof, and the advantageous, new and useful results obtained thereby, the new and useful construction and reasonable mechanical equivalents thereof obvious to those skilled in the art are set forth in the appended claims.

I claim:

1. Centrifugal clutch construction including a hub member, a resilient spider composed substantially of resilient material having radial projections thereon forming the sides and bottoms of recessed portions therebetween, a first side plate mounted on the hub member abutting one side of the spider and extending radially beyond the bottoms of said recessed portions, said radial projections on said spider having holes formed therein, driving pins connected to said first side plate and engaged in said holes, a second side plate abutting the other side of the spider connected to the drive pins and extending radially beyond the bottoms of said recessed portions, friction segments mounted in said recessed portions and extending between and spaced from said first and second side plates, a housing member, and spring means engaged with said friction segments; whereby the friction segments are engageable with the housing member in response to centrifugal force upon rotation of the hub member, the spring means opposes movement of the friction segments until a predetermined hub member speed is attained, and the friction segments are permitted to shift and tilt axially between the first and second side plates.

2. Centrifugal clutch construction including a hub member, a resilient spider composed substantially of resilient material having radial projections thereon forming recessed portions therebetween mounted on the hub member surrounding an axial portion of said hub member and for rotation therewith, friction segments having friction surfaces, said friction segments being mounted in the recessed portions in the spider, shim members mounted in the recessed portions between the friction segments and spider recesses, a housing member having an axially extending flange portion peripherally surrounding and spaced from the friction surfaces of the friction segments, and delayed engagement spring means engaged with the friction segments normally retaining the friction segments in the spider recessed portions against the shim members until the hub member is rotated above a predetermined engaging speed.

3. Centrifugal clutch construction including a rotatable hub member, a resilient spider composed substantially of resilient material having radial projections thereon forming recessed portions with outwardly angled sides therebetween, means mounting said spider on said hub member surrounding an axial portion of said hub member and for rotation therewith, friction segments having friction surfaces and outwardly angled sides, said friction segments being mounted in the spider recessed portions with the outwardly angled sides of the friction segments abutting the outwardly angled sides of the recessed portions, a housing member having an axially extending flange portion peripherally surrounding and spaced from the friction surfaces of the friction segments, and delayed engagement spring means engaged with the friction segments normally retaining the friction segments in the spider recessed portions until the hub member is rotated above a predetermined engaging speed; whereby when the centrifugal force on the friction segments overcomes the spring means resistance and the friction segments engage the flanged portion of the housing member, the outwardly angled sides of the recessed portions of the spider and on the friction segments cause the friction segments to wedge between the spider and the flange portion of the housing member.

4. Centrifugal clutch construction including a rotatable hub member, a resilient spider composed substantially of resilient material having radial projections thereon forming recessed portions with outwardly angled sides therebetween, means mounting said spider on said hub member surrounding an axial portion of said hub member and for rotation therewith, shim members mounted in said spider recessed portions, friction segments having friction surfaces and outwardly angled sides, said friction segments being mounted on the shim members and in the spider recessed portions with the outwardly angled sides of the friction segments abutting the outwardly angled sides of the recessed portion shims, a housing member having an axially extending flange portion peripherally surrounding and spaced from the friction surfaces of the friction segments, and delayed engagement spring means engaged with and normally retaining the friction segments in the spider recessed portions against the shim members until the hub member is rotated above a predetermined engaging speed.

5. Centrifugal clutch construction including a rotatable hub member, a first radially projecting side plate mounted on said hub member having spaced axially extending thimble portions formed therein, a resilient spider composed substantially of resilient material having spaced holes formed therein with its one side abutting said first side plate and with the thimble portions of said first side plate extending into said spider holes, a second radially projecting side plate mounted on the hub member and having spaced axially extending thimble portions formed therein, said second side plate abutting the other side of the spider with the thimble portions thereof extending into said spider holes, a housing member, friction means engaged with said spider and engageable with said housing in response to centrifugal force on rotation of the hub member, and spring means engaged with said friction means normally holding the friction means out of engagement with the housing member.

6. Centrifugal clutch construction including a hub member having a knurled portion formed thereon, a first radially projecting side plate having a centrally located axially extending sleeve formed therein, a second radially projecting side plate having a centrally located axially extending sleeve formed therein, said first and second side plate being mounted on said hub member axially spaced from each other with their sleeves pressed onto the knurled portion of the hub member, a resilient spider composed substantially of resilient material mounted between the side plates surrounding an axial portion of said hub, means connecting said side plates and said spider, a housing member, friction means engaged with said spider and engageable with said housing in response to centrifugal force on rotation of the hub member, and spring means engaged with said friction means normally holding the friction means out of engagement with the housing member.

7. Centrifugal clutch construction including a hub member having a knurled portion formed thereon, a first radially projecting side plate having a centrally located axially extending sleeve formed therein and circumferentially spaced axially extending thimble portions formed therein, a second radially projecting side plate having a centrally located axially extending sleeve formed therein and circumferentially spaced axially extending thimble portions formed therein, said first and second side plates being mounted on said hub member axially spaced from each other with the sleeves pressed on the knurled portion of the hub member, a resilient spider composed substantially of resilient material having radial projections thereon forming recessed portions with outwardly angled sides therebetween, said radial projections having holes formed therein, said spider mounted between first and second side plates surrounding an axial portion of said hub and with the circumferentially spaced thimble portions of the side plates extending into said spider holes, friction segments having friction surfaces and outwardly angled sides, said friction segments being mounted in the spider recessed portions with the outwardly angled sides of the friction segments abutting the outwardly angled sides of the recessed portions, a housing member having an axially extending flange portion peripherally surrounding and spaced from the friction surfaces of the friction segments, and delayed engagement spring means engaged with the friction segments normally retaining the friction segments in the spider recessed portions until the hub member is rotated above a predetermined engaging speed; whereby when the centrifugal force on the friction segments overcomes the spring means resistance and the friction segments engage the flange portion of the housing member, the outwardly angled sides of the recessed portions of the spider and on the friciton segments cause the friction segments to wedge between the spider and the flange portion of the housing member.

8. Centrifugal clutch construction including an axially extending first hub member, a resilient spider composed substantially of resilient material having radial projections thereon forming recessed portions with outwardly angled sides therebetween, means mounting said spider on said first hub member surrounding an axial portion of said hub member and for rotation therewith, a second axially extending hub member journalled on the first hub member, a radially outwardly extending side plate connected to said second hub member, an annular axially extending flange portion connected to said side plate, friction segments having friction surfaces and outwardly angled sides, said friction segments mounted in the recessed portions in the spider with the outwardly angled sides of the friction segments abutting the outwardly angled sides of the recessed portions, said flange portion peripherally surrounding and spaced from the friction surfaces of the friction segments, and delayed engagement means engaged with the friction segments normally retaining the friction segments in the spider recessed portions until the hub member is rotated above a predetermined engaging speed; whereby when the centrifugal force on the friction segments overcomes the spring means resistance and the friction segments engage the flange portion, the outwardly angled sides of the recessed portions of the spider and on the friction segments cause the friction segments to wedge between the spider and the flange portion of the housing member.

9. Centrifugal clutch construction including a first axially extending hub member, a radially projecting first side plate mounted on the hub member, a resilient rubber spider composed substantially of resilient material having radial projections thereon forming recessed portions with outwardly angled sides therebetween, said radial projections having holes formed therein, drive pins connected to said first side plate and received in said holes in said radial projections, a second radially projecting side plate having holes formed therein loosely mounted on said first hub member and spaced from said first side plate, said drive pins received in the holes formed in said second side plate with the first and second side plates clamping the spider therebetween and surrounding an axial portion of said first hub member, shim members mounted in said recessed portions of the spider, friction segments having friction surfaces and outwardly angled sides, said friction segments being received on the shim members and in the recessed portions in the spider with the outwardly angled sides of the friction segments abutting the outwardly angled sides of the recessed portions, a second axially extending hub member substantially aligned with and spaced from said first hub member, a radially outwardly extending third side plate connected to said second hub member, an annular axially extending flange portion connected to said third side plate and peripherally surrounding and spaced from the friction surfaces on the friction segments, said friction surfaces on the friction segments having circumferentially extending grooves formed therein, and an annular spring means engaged in said grooves of the friction segments and normally retaining the friction segments in the spider recessed portions until the first hub member is rotated above a predetermined engaging speed; whereby when the centrifugal force of the friction segments overcomes the spring means resistance and the friction segments engage the flange portion connected to the third side plate, the outwardly angled sides of the recessed portions of the spider and on the friction segments cause the friction segments to wedge between the spider and the flange portion.

10. Centrifugal clutch construction including a first axially extending hub member having a knurled portion formed thereon, a first radially projecting side plate having a centrally located axially extending sleeve formed therein and circumferentially spaced axially extending thimble portions formed therein, a second radially projecting side plate having a centrally located axially extending sleeve formed therein and circumferentially spaced axially extending thimble portions formed therein, said first and second side plates being mounted on said hub member in spaced apart relation with their centrally located sleeves pressed on the knurled portion of the hub member, a resilient spider composed substantially of resilient material having radial projections thereon forming recessed portions with outwardly angled sides therebetween, said radial projections having holes formed therein, said spider mounted between said first and second side plates surrounding an axial portion of said first hub member with the circumferentially spaced thimble portions of the side plates extending into said spider holes, shim members mounted in said recessed portions of the spider, friction segments having friction surfaces and outwardly angled sides, said friction segments mounted on the shim member and in the spider recessed portions with the outwardly angled sides of the friction segments abutting the outwardly angled sides of the recessed portions, a second axially extending hub member journalled on the first hub member, a radially outwardly extending third side plate connected to said second hub member, an annular axially extending flange portion connected to said third side plate and peripherally surrounding and spaced from the friction surfaces of the friction segments, said friction surfaces on the friction segments having circumferentially extending grooves formed therein, an annular spring means engaged in said grooves in the friction segments and normally retaining the friction segments in the spider recessed portions until the first hub member is rotated above a predetermined engaging speed; whereby when the centrifugal force of the friction segments overcomes the spring means resistance and the friction segments engage the flange portion connected to the third side plate, the outwardly angled sides of the recessed portions of the spider and on the friction segments cause the friction segments to wedge between the spider and the flange portion.

11. Centrifugal clutch construction including a rotatable hub member, a housing member, resilient material means connected to the hub member radially outwardly thereof and for rotation therewith, said resilient material means having surfaces extending such that certain portions of said surfaces are spaced from the center of rotation of the hub member a lesser distance than other portions of said surfaces, friction element means having surfaces engaged with parts of said certain portions providing a torque transmitting connection therebetween and the friction element means being movable radially outwardly and accompanied by relative sliding between said engaged surfaces to engage the housing member in response to centrifugal force upon rotation of the hub member, the friction element means moving outwardly in response to centrifugal force and engaging the housing member independent of any outward movement of the resilient material means, the sole torque transmitting connection between the hub member and the friction element means being through said engagement between said surfaces of the resilient material means and the friction element means, and spring means engaged with the friction element means normally holding the friction element means out of engagement with the housing member.

12. Centrifugal clutch construction including a rotatable hub member, resilient spider means composed substantially of resilient material mounted on the hub member for rotation therewith and having resilient material radial projections thereon forming recessed portions therebetween, said resilient spider means substantially surrounding an axial portion of said hub member, a housing member, friction element means having surfaces thereon and being mounted with said surfaces engaged with at least portions of surfaces formed on said spider means recessed portions providing a torque transmitting connection therebetween, the sole torque transmitting connection between the hub member and the friction element means being through said engagement between said surfaces of the resilient spider means and the friction element means, said friction element means being engageable with said housing member in response to centrifugal force and transmitting torque from said resilient spider to said housing member, and delayed engagement spring means engaged with the friction element means normally retaining the friction element means out of engagement with the housing member until the hub member is rotated above a predetermined engaging speed.

13. Centrifugal clutch construction including a rotatable hub member, a radially projecting side plate mounted secured on the hub member, resilient material means having holes formed therein, drive pins connected to the side plate and retained against at least radial movement by said side plate, said drive pins being received in the resilient material means holes forming a torque transmitting connection between the side plate and the resilient material means, said resilient material means having surfaces extending such that certain portions of said surfaces are spaced from the center of rotation of the hub member a lesser distance than other portions of said surfaces, friction element means having surfaces engaged with parts of said certain portions providing a torque transmitting connection therebetween, a housing member, the friction element means being movable radially outwardly and accompanied by relative sliding movement between said engaged surfaces to engage the housing member in response to centrifugal force upon rotation of the side plate through the hub member, the friction element means moving outwardly in response to centrifugal force and engaging the housing member independent of any outward movement of the resilient material means, the sole torque transmitting connection between the hub member and side plate and friction element means being through said engagement between said surfaces of the resilient material means and the friction element means, and spring means engaged with said friction element means normally holding the friction element means out of engagement with the housing member.

14. Centrifugal clutch construction including a rotatable hub member, a housing member, resilient material means connected to the hub member radially outwardly thereof and for rotation therewith, said resilient material means having surfaces extending such that certain portions of said surfaces are spaced from the center of rotation of the hub member a lesser distance than other portions of said surfaces, friction element means having surfaces engaged with parts of said certain portions providing a torque transmitting connection therebetween, the friction element means being movable radially outwardly and accompanied by relative sliding between said engaged surfaces to engage the housing member in response to centrifugal force upon rotation of the hub member, the engaged surfaces on the resilient material means and the friction element means being formed to provide a wedging action between the resilient material means and the friction element means when the friction element means is engaged with the housing member, the friction element means moving outwardly in response to centrifugal force and engaging the housing member independent of any outward movement of the resilient material means, the sole torque transmitting connection between the hub member and the friction element means being through said engagement between said surfaces of the resilient material means and the friction element means, and spring means engaged with the friction element means normally holding the friction element means out of engagement with the housing member.

15. Centrifugal clutch construction as defined in claim 14 in which shim members are mounted between the engaged surfaces of the resilient material means and the friction element means.

16. Centrifugal clutch construction as defined in claim 14 in which the housing member includes a housing hub member axially aligned with and spaced from said rotatable hub member, and an annular axially extending flange portion connected to said housing hub member; and in which the friction element means are engageable with the housing member flange portion in response to centrifugal force.

17. Centrifugal clutch construction as defined in claim 14 in which the housing member includes a housing hub member journaled on said rotatable hub member, and an annular axially extending flange portion connected to said housing hub member; and in which the friction element means are engageable with said housing member flange in response to centrifugal force.

References Cited in the file of this patent

UNITED STATES PATENTS

| 2,350,810 | Pentz | June 6, 1944 |
| 2,375,909 | Fawick | May 15, 1945 |

FOREIGN PATENTS

| 208,863 | Great Britain | Jan. 3, 1924 |
| 767,258 | France | May 1, 1934 |